US007017110B1

(12) United States Patent
Chi et al.

(10) Patent No.: US 7,017,110 B1
(45) Date of Patent: Mar. 21, 2006

(54) SYSTEM AND METHOD FOR INFERRING USER INFORMATION NEED IN HYPERMEDIA LINKED DOCUMENT COLLECTION

(75) Inventors: Ed H. Chi, Palo Alto, CA (US); Peter L. Pirolli, San Francisco, CA (US); James E. Pitkow, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/540,063

(22) Filed: Mar. 31, 2000

(51) Int. Cl.
*G06F 17/00* (2006.01)
(52) U.S. Cl. .................................................. 715/501.1
(58) Field of Classification Search ............. 715/501.1; 345/854
See application file for complete search history.

(56) References Cited

U.S. PATENT DOCUMENTS

| 5,446,891 | A  | * | 8/1995  | Kaplan et al. ................. 707/2 |
| 5,754,939 | A  | * | 5/1998  | Herz et al. ................. 455/3.04 |
| 5,835,905 | A  |   | 11/1998 | Pirolli et al. ................... 707/3 |
| 5,855,015 | A  | * | 12/1998 | Shoham ......................... 707/5 |
| 6,115,718 | A  | * | 9/2000  | Huberman et al. ......... 707/102 |
| 6,272,507 | B1 | * | 8/2001  | Pirolli et al. ................. 715/513 |

OTHER PUBLICATIONS

P. Pirolli et al. Silk Form a Sow's Ear: Extracting Usable Structures From the Web, Proceddings of the Conference of Human Factors in Computing Systems, CHI 96, Vancouver, British Columbia, Canada, Apr. 13-18, 1996, pp. 1-17.*
S. Card et al., "Automatic Analysis, Theme Generation, and Summarization of Machine-Readable Texts" in Readings in Information Visualization, *Morgan Kaufman*, Los Altos, California, 1999.
E. Chi et al., An Operator Interaction Framework for Visualization Systems, *Proceedings of the IEEE Information Visualization Symposium*, 1998, pp. 63-70.
E. Chi et al., Visualizing the Evolution of Web Ecologies, *CHI '98, Proceedings of the Conference on Human Factors in Computing Systems*, Los Angeles, California, Apr. 18-23, 1998, pp. 400-407.
G.W. Furnas, Effective View Navigation, *Proceedings of the Human Factors in Computing Systems, CHI '97*, Atlanta, Georgia, 1997, pp. 367-374.
P. Pirolli, Computational Models of Information Scent-Following in a Very Large Browsable Text Collection, *Proceedings of the Conference on Human Factors in Computing Systems, CHI '97*, Atlanta, Georgia, 1997, pp. 3-10.
P. Pirolli et al., Information Foraging, *Psychological Review*, (in press).

(Continued)

*Primary Examiner*—Stephen Hong
*Assistant Examiner*—G. Vaughn (57) ABSTRACT

The present invention provides a system and method for inferring information need in a collection of hypermedia documents that is based on the observation that a user's hypertext link traversal decisions are typically based on the nature of that user's information need. The system identifies the hypermedia linkage structure among the plurality of documents in the collection. The documents include content items that may be relevant to a user information need. The system then accepts a user path item that represents a user's hypermedia link traversal history and applies a network flow model to the user path item in the hypermedia link information in order to create a document vector. The system also determines the distribution of the content items in the document collection, and then compares the document vector to the content item distribution in order to determine an inferred information need.

9 Claims, 5 Drawing Sheets

OTHER PUBLICATIONS

P. Pirolli et al., Silk From a Sow's Ear: Extracting Usable Structures From the Web, *Proceedings of the Conference of Human Factors in Computing Systems, CHI 96*, Vancouver, British Columbia, Canada, Apr. 13-18, 1996, pp. 118-125.

P. Pirolli et al., Distributions of Surfers' Paths Through the World Wide Web: Empirical Characterizations, *World Wide Web 1*, 1999, pp. 1-17.

J. Pitkow et al., Life, Death, and Lawfulness on the Electronic Frontier, *Proceedings of the Conference on Human Factors in Computing Systems, CHI 97*, Atlanta, Georgia, Mar. 22-27, 1997, pp. 383-390.

J. Pitkow et al., Mining Longest Repeated Subsequences to Predict World Wide Web Surfing, *Proceedings of the USENIX Conference on Internet*, 1999 (in press).

J.M. Spool et al., Measuring Website Usability, *Proceedings of the Conference on Human Factors in Computing Systems, CHI '98*, Los Angeles, California, 1998, p. 390.

* cited by examiner

$$T = \begin{array}{|c|c|c|c|c|c|c|}\hline 0 & 1 & 0 & 0 & 0 & 0 & 0 \\\hline 0 & 0 & 1 & 1 & 0 & 1 & 0 \\\hline 0 & 0 & 0 & 1 & 0 & 0 & 0 \\\hline 0 & 0 & 0 & 0 & 0 & 0 & 0 \\\hline 0 & 0 & 0 & 0 & 0 & 1 & 1 \\\hline 0 & 1 & 0 & 0 & 0 & 0 & 1 \\\hline 0 & 0 & 0 & 0 & 0 & 1 & 0 \\\hline \end{array}$$

*FIG. 5A*

| 0: | Java |
| 1: | API |
| 2: | Sun |
| 3: | Home |
| 4: | Coffee |
| 5: | Support |
| 6: | Petes |
| 7: | Tea |

*FIG. 5B*

$$W = \begin{array}{|c|c|c|c|c|c|c|}\hline 0 & 1 & 1 & 1 & 0 & 1 & 0 \\\hline 0 & 0 & 0 & 1 & 0 & 0 & 0 \\\hline 1 & 0 & 0 & 0 & 0 & 0 & 0 \\\hline 1 & 1 & 0 & 0 & 0 & 0 & 0 \\\hline 0 & 0 & 0 & 0 & 0 & 1 & 0 \\\hline 0 & 0 & 1 & 0 & 0 & 0 & 0 \\\hline 0 & 0 & 0 & 0 & 1 & 0 & 0 \\\hline 0 & 0 & 0 & 0 & 0 & 0 & 1 \\\hline \end{array}$$

*FIG. 5C*

SYSTEM AND METHOD FOR INFERRING USER INFORMATION NEED IN HYPERMEDIA LINKED DOCUMENT COLLECTION

CROSS-REFERENCES TO RELATED APPLICATIONS

The present application is related to commonly assigned U.S. Pat. No. 6,671,711, entitled "System and Method For Predicting Web User Flow by Determining Association Strength of Hypermedia Links", which was filed concurrently with the present application.

FIELD OF THE INVENTION

The present invention relates to the field of analysis and design of hypermedia linked collections of documents, and in particular to a method for inferring user information need from observed web usage information.

BACKGROUND

The users of hypertext linked documents such as the World Wide Web, typically forage for information by navigating from document to document by selecting hypertext links. A piece of information such as a snippet of text is typically associated with each hypertext link. The snippet of text provides the user with information about the content of the document at the other end of the link. When the link leads the user to a document that is relevant to his information need, the user comes closer to satisfying his information need, thus reducing the amount of time that he will continue to forage for information. However, if the link leads the user to a document that is not relevant, then the user will continue foraging for information.

The structural linkage topology of collections of hypermedia linked documents is similar to a highway system. In a highway system, a traveler begins at some origin point and travels along the roads of the highway system in order to reach a desired destination. Along the way, the traveler may see signs that indicate which roads he should take to reach his desired destination. For example, a traveler who wishes to go from his home to the local airport might travel along the roadways until seeing a sign with the words "international airport" or a sign with a picture of an airplane. Either sign could give traveler information about which highway ramp to take in order to reach the airport. If the signs do not exist or if they are confusing, the traveler would probably not be able to find his destination.

Similarly, a user on the Web might start from one web page and select links based on whether they look like they might lead the user to another web page that might satisfy his information need. The links are analogous to roadways that can take the user to his destination, the information need. How well these links will lead users to their desired destinations depends on a complex interaction of user goals, user behaviors, and Web site designs.

Designers and researchers who want to know how users will interact with the Web develop hypotheses about these complex interactions. In order to evaluate these hypotheses rapidly and efficiently, tools need to be created to deal with the complexity of these interactions. Existing approaches to evaluate these hypotheses include extracting information from usage data such as Web log files, and applying metrics such as the number of unique users, the number of page visits, reading times, session links, and user paths. The degree of reliability of these approaches varies widely based upon the different heuristics used. For example, most existing Web log file analysis programs provide little insight into user Web interactions because they merely provide simple descriptive statistics on where users have been.

One shortcoming of existing approaches is that they focus on the destination of the user's visit, and not on the user's true information goal. Thus, there is a need for a system and method for inferring user information need in a hypermedia linked document collection.

SUMMARY OF THE INVENTION

An embodiment of the present invention provides a system and method for inferring information need in a collection of hypermedia documents. The system and method of the present invention make use of the observation that a user's hypertext link traversal decisions are typically based on the nature of that user's information need. The system identifies the hypermedia linkage structure among the plurality of documents in the collection, where the documents include content items that may be relevant to a user information need. The system then accepts a user path item that represents a user's hypermedia link traversal history. The system then applies the network flow model to the user path item in the hypermedia link information in order to create a document vector. The system also determines the distribution of the content items in the document collection, and then compares the document vector to the content item distribution in order to determine an inferred information need.

DETAILED DESCRIPTION

The present invention provides a system and method for inferring user information need in a collection of hypermedia linked documents. The system operates on the principle that a user's hypertext link traversal decisions are typically based on the nature of that user's information need. For example, at any point in the user's traversal through the collection of documents, the user has expressed her interest in various pieces of information by her decision to select certain links. The user information need is inferred by analyzing the list of documents representing a user's traversal history in the context of a collection of hypermedia linked documents.

Structure of a Hypermedia Linked Document Collection

Figure 1:
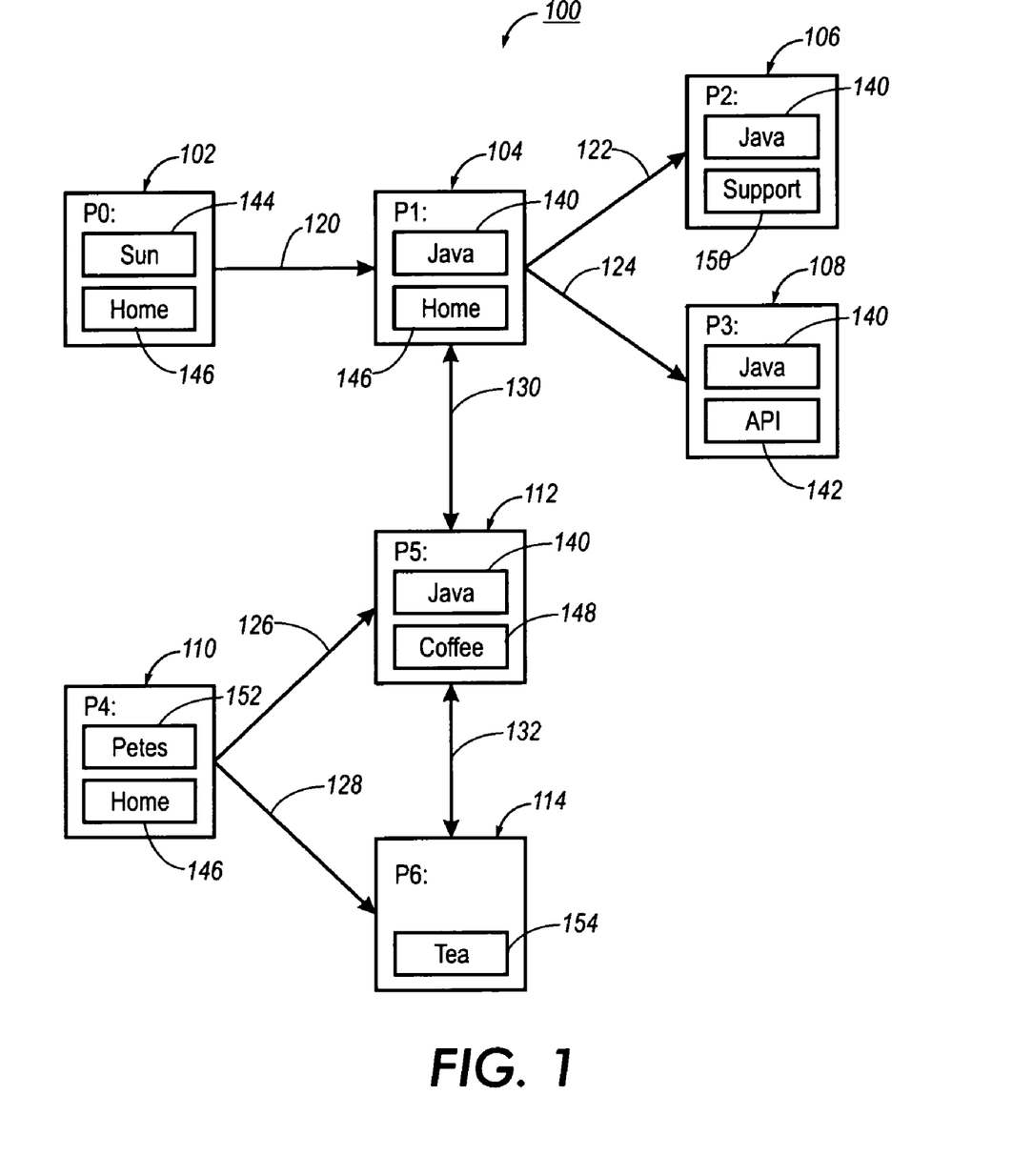
FIG. 1 is a block diagram illustrating the structural linkage and content of a collection of hypermedia linked documents.

FIG. 1 is a block diagram 100 illustrating the structural linkage and content of a collection of hypermedia linked documents. Documents P0, P1, P2, P3, P4, P5 and P6, are indexed and shown as 102, 104, 106, 108, 110, 112 and 114. Documents P0–P6 are linked as shown by hypermedia links 120, 122, 124, 126, 128, 130 and 132. The hypermedia links may be any type of linked from one document to another, including hypertext links. An example of the kind of document shown in P0–P6 (102–114) is a web site. Content items 140–154 are located in documents P0–P6 as shown. The content items may be any type of content that is accessible via a hypermedia link, for example text keywords, graphics, or other media. The content of documents associated with these hypermedia links is usually presented to the user by some proximal cue such as a snippet of text or a graphic. Web users that are foraging for information use these proximal cues when making their traversal decisions. If the proximal cue looks like it will lead to a document that is relevant to the user's information need, the user will select that link.

Method for Inferring Information Need

Figure 2:
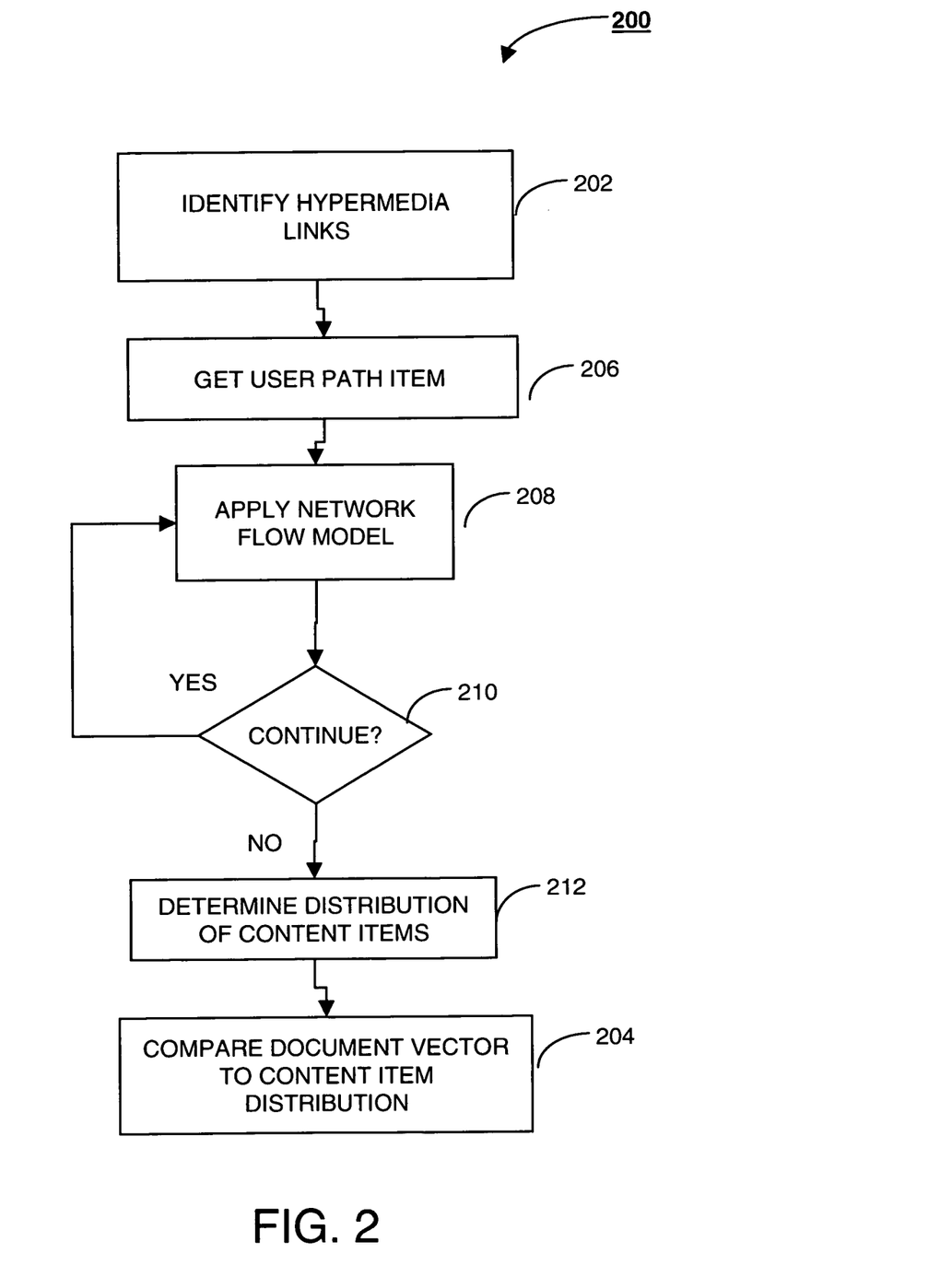
FIG. 2 is a flowchart illustrating steps that are performed in a method for inferring a user information need in an embodiment of the present invention.

FIG. 2 is a flowchart 200 illustrating steps that are performed in a method for inferring information need in an embodiment of the present invention. The hypermedia links in a document collection are identified, step 202. The documents in the collection contain a plurality of content items. These content items may include text, graphics, streaming video and other media. A user path item is received as input, step 206. The user path item contains a list of documents and is obtained from a user's traversal path history through the hypermedia links document collection. A plurality of user path items may also be used as input. The reason for obtaining the user path item is that a user's traversal path is assumed to represent or at least approximate the user's information need.

The user path item may be expressed as a vector with the more recent documents weighted more heavily, based on the assumption that the more recently accessed documents are closer to the user's information need. A network flow model is applied to the user path item, step 208, resulting in a list of documents that represent the information need. A decision, step 210, may be made to apply another iteration of the network flow model, step 208, or to stop processing and move on to step 212, in which the distribution of the content items in the document collection is determined. The distribution of the content items may be determined by standard information retrieval techniques such as TF.IDF (defined as "term frequency inverse document frequency" weighting scheme) to weight the content items by a frequency in the document collection, as discussed in "Foundations of Statistical Natural Language Processing", C. Manning and H. Schuetze, 1999, MIT Press, p. 542, which is incorporated by reference herein. A variety of other weighting schemes may also be used. The result is a list of content items, for example a list of keywords, which represent an inferred information need.

Figure 3:
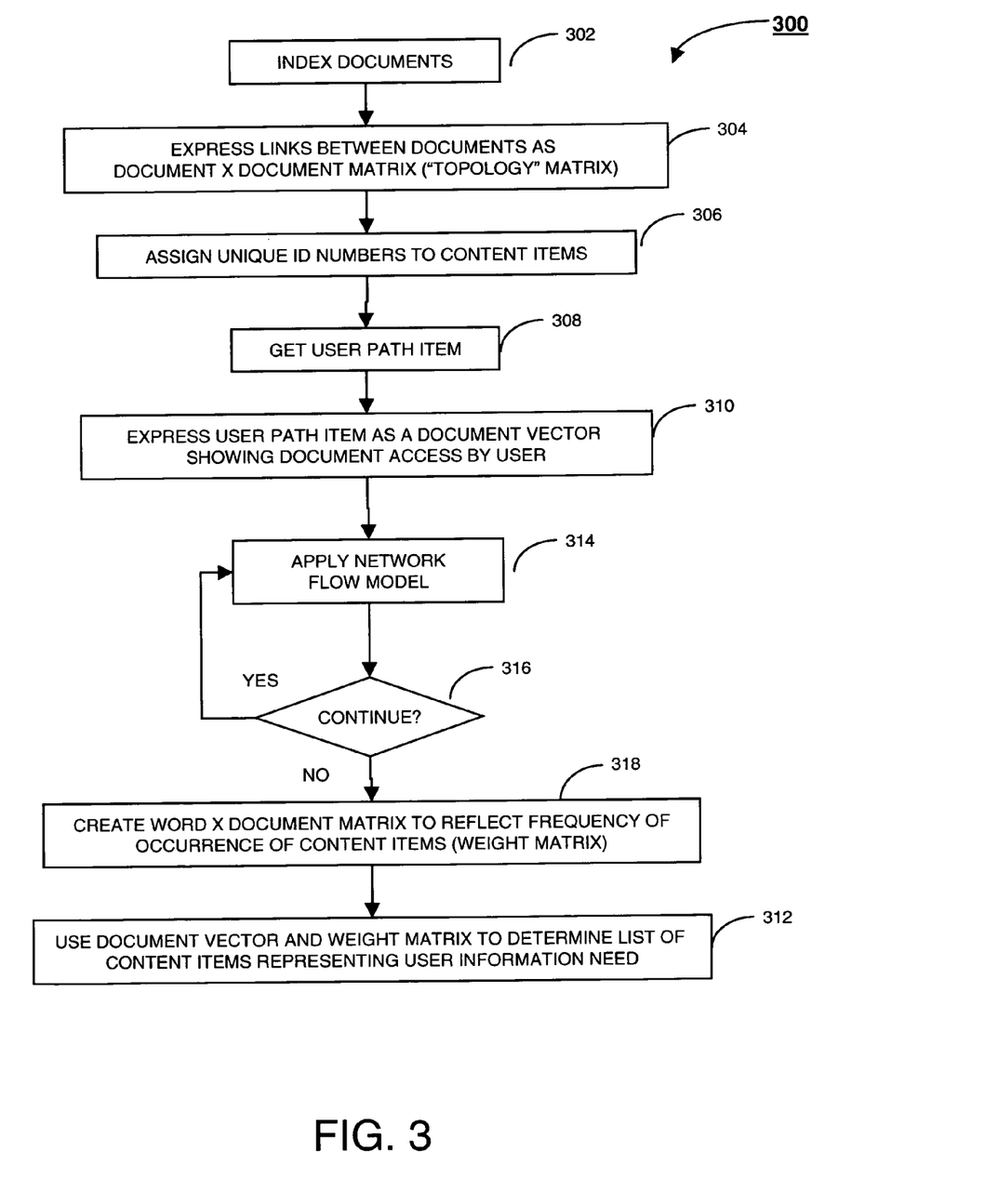
FIG. 3 is a flowchart illustrating steps that are performed in a method for inferring a user information need in an embodiment of the present invention.
Figure 5A:
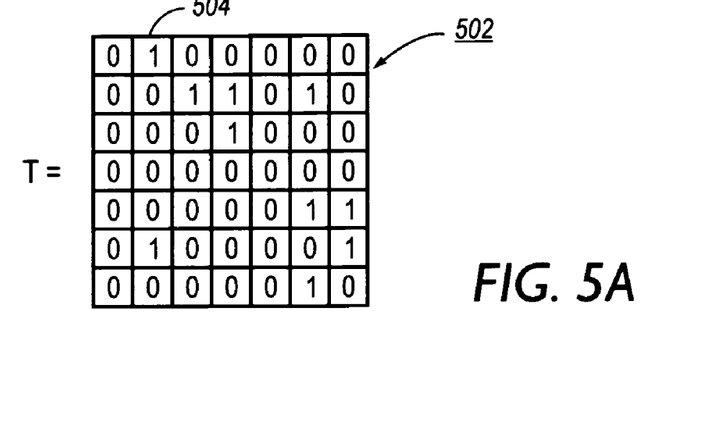
FIGS. 5A, 5B and 5C illustrate exemplary matrices that are used in an embodiment of the present invention.

FIG. 3 is a flowchart 300 illustrating an example of steps that may be performed in a method for inferring information need in an embodiment of the present invention. The documents in the collection are indexed, in step 302. For example, as shown in block diagram 100 of FIG. 1, P0–P6 represent documents 102, 104, 106, 108, 110, 112 and 114 respectively. The document collection has a set of hypermedia links that forms a graph. The hypermedia links between documents are expressed as an adjacency (document×document) matrix, step 304. The document×document matrix represents the topology of the structural linkage of the document collection. FIG. 5A shows an example of a document×document matrix 502, identified as matrix T, that represents the hypermedia link topology of the document collection shown in block diagram 100 of FIG. 1. The rows and columns of topology matrix T 502 are indexed by the document IDs P0–P6 of FIG. 1, and a matrix entry of "1" represents that an outlink exists from one document to another. For example, in topology matrix T 502, the "1" located in the first row, second column, at position 504 in FIG. 5A, indicates that there is an outlink 120 (FIG. 1) from document P0 102 to document P1 104. Similarly, other values of "1" in the topology matrix T 502 also indicate outlinks.

Figure 5B:
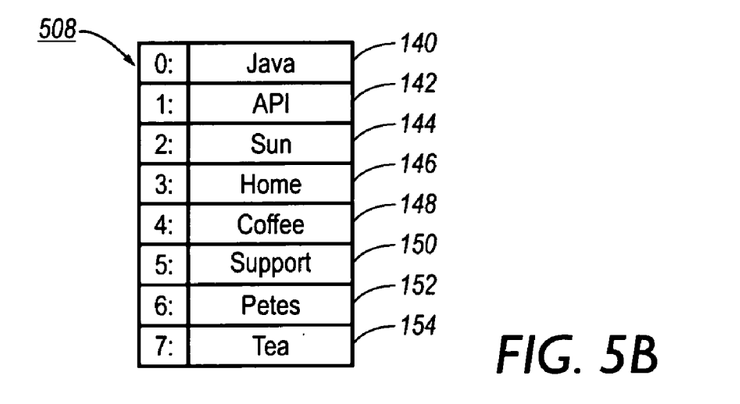

Referring again to FIG. 3, unique ID numbers are assigned to the content items in the document collection, step 306, in order to identify them. For example, in FIG. 1, there are eight unique items: "Java" 140 (contained in documents P1, P2, P3 and P5), "API" 142 (contained in document P3), "Sun" 144 (contained in document P0), "Home" 146 (contained in documents P0 and P4), "coffee" 148 (contained in document P5), "support" 150 (contained in document P2), "Petes" 152 (contained in document P4) and "Tea" 154 (contained in document P6). These eight content items, as shown in indexed content item list 508 in FIG. 5B, are indexed as follows: 0: Java, 1: API, 2: Sun, 3: Home, 4: Coffee, 5: Support, 6: Petes and 7: Tea.

With continued reference to FIG. 3, a user path item is obtained as input, step 308. The user path item is a list of documents that have been traversed by a user via the hypermedia links. The user path item is then expressed as a document vector showing document accessed by the user, step 310. For example, a document vector such as Q=[1 2 0 3 0 0 0] indicates that documents P0, P1 and P3 have been accessed and document P3 has been weighted the most heavily, followed by documents P1 and P0. Typically, documents that have been accessed more recently are weighted more heavily based on the assumption that the user comes closer to meeting his information need as he continues to traverse the hyperlinks in the document collection.

A network flow model is applied musing the document vector, at step 314. Any traditional network flow model may be used. A spreading activation algorithm may be used, for example as discussed in "System for Predicting Documents Relevant to Focus Documents by Spreading Activation Through Network Representations of a Linked Collection of Documents", U.S. Pat. No. 5,835,905 by Pirolli, et al., which is incorporated by reference herein. Spreading activation can be characterized as a process that identifies knowledge predicted to be relevant to some focus of attention. Spreading activation techniques are based on representations of Web pages as nodes in graph networks representing usage, content, and hypertext relations among Web pages. Conceptually, activation is pumped into one or more of the graph networks at nodes representing some starting set of Web pages (i.e. focal points) and it flows through the arcs of the graph structure, with the amount of flow modulated by the arc strengths (which might also be thought of as arc flow capacities). The asymptotic pattern of activation over nodes will define the degree of predicted relevance of Web pages to the starting set of Web pages.

The spreading activation technique used for relevance prediction assumes that one may identify a pattern of input activation that represents a pattern or focus of attention. For instance, the focus may be a specific Web page or a prototype of a category. Activation from this focus point(s) spreads through one or more of the three graphs and eventually settles into a stable pattern of activation across all nodes. The activation values are assumed to be the predicted relevance to the input focus. Activation is pumped into one or more of the graph networks at nodes representing some starting set of focus Web pages. The activation flows through the arcs of the graph structure, with the amount of flow modulated by the arc strengths (which might also be thought of as arc flow capacities). The asymptotic pattern of activation over nodes will define the degree of predicted relevance of Web pages t the starting set of focus Web pages. The set of source nodes of activation being pumped into the network is represented by a vector.

With reference again to FIG. 3, a decision, step 316, may be made to continue and apply another iteration of the network flow model, step 314, or to continue processing at step 318, which is described below. The decision to continue may be based on a number of factors, including iterating for a predetermined number of steps, iterating based on a proportion of users who continue to select hypermedia links, or comparing the total number of users to a predetermined threshold. The proportion of users who continue to select hypermedia links may be determined by the function $\alpha(L)$, which is also known as "the law of surfing", as described in P. Pirolli and J. E. Pitkow, "Distributions of surfers' paths through the World Wide Web: Empirical characterization", 1999, World Wide Web (2): pp. 29–45 and Huberman, B. A., P. Pirolli, J. Pitkow, R. Lukose, "Strong regularities in World Wide Web surfing", 1999, Science 280: pp. 95–97, which are incorporated by reference herein.

Figure 5C:
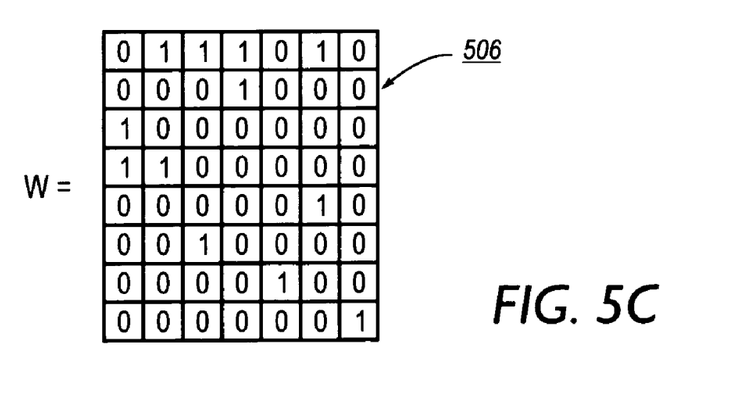

In step 318, a word×document matrix is created to reflect the frequency of occurrence of content items in the document collection. The resulting weighting matrix represents the distribution of the content items in the document collection. An example of a weighting matrix W 506 is shown in FIG. 5C. The distribution of the content items may be determined by standard information retrieval techniques such as TF.IDF to weight the content items by a frequency in the document collection, as discussed in "Foundations of Statistical Natural Language Processing", C. Manning and H. Schuetze, 1999, MIT Press, p. 542, which is incorporated by reference herein. A variety of other weighting schemes may also be used.

With continued reference to FIG. 3, the weighting matrix W 506 (FIG. 5C) and the document vector are used in step 312 to look up a list of content items that represent an inferred information need. For example, starting with document vector Q=[1 2 0 3 0 0 0], described above, and taking the exponential in accordance with Luce's Theorem, a list of content items (in this case, keywords) may be represented by $A(1) = Q^T = [2.7183\ 7.3891\ 1\ 20.0855\ 1\ 1\ 1]$. Multiplying weighting matrix W 418 by A(1) gives R1=W*A(1)=[29.47 20.09 2.72 10.11 1 1 1 1]. The top two values, 29.47 and 20.09, followed by a third value 10.11, correspond to items 0, 1 and 3 in the indexed content item list 508 of FIG. 5B. Content item 0 is "Java" 140, content item 1 is "API", and content item 3 is "Home". Thus, the top two keywords are "Java" and "API", followed by the word "Home". These keywords are the content items that represent the inferred user information need based on the input user path. Note that the network flow model may be applied again, as described above.

System for Inferring Information Need

Figure 4:
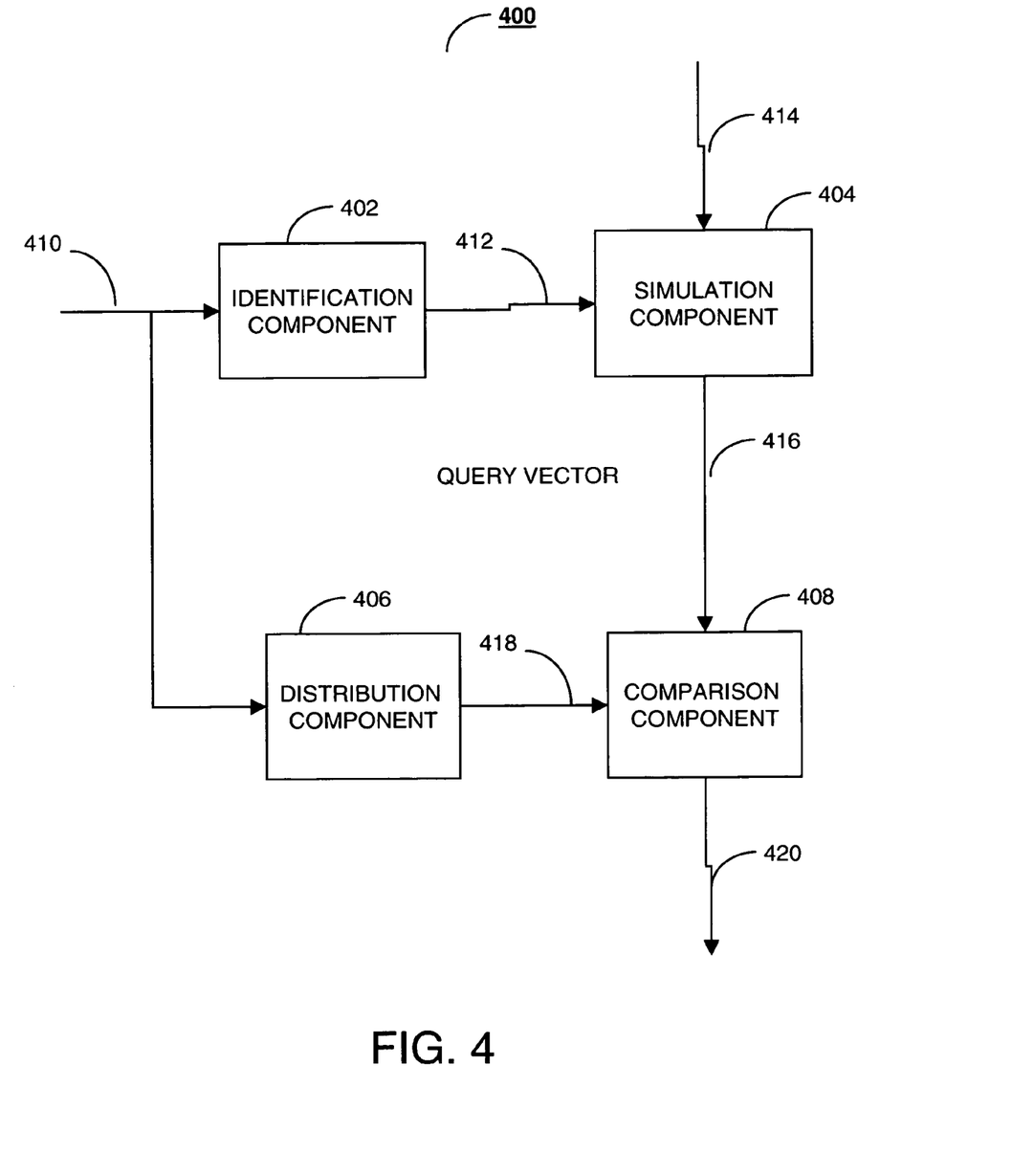
FIG. 4 is a block diagram of a system for inferring information need in a hypermedia linked document collection in an embodiment of the present invention.

A system for inferring information need in a plurality of hypermedia linked documents in an embodiment of the present invention, is shown in block diagram 400 of FIG. 4. The system includes an identification component 402. Identification component 402 responds to a hypermedia linked document collection input 410, and identifies the hypermedia links of a plurality of documents. Identification component 402 may be used to perform method steps 202 in FIG. 2 and 302–304 in FIG. 3. The identified links 412 and a user path item input 414 are acted upon by simulation component 404 to produce a document vector 416.

The simulation component 404 applies a network flow model. The network flow model may be any suitable traditional network flow model, for example a spreading activation algorithm as described above. The simulation component may operate in successive iterations and then stop when a particular condition is satisfied. For example, the simulation may continue for a predetermined number of steps or link traversals. The simulation may continue until a proportion of users who continue exceeds, reaches or drops below a desired level, as determined by the function $\alpha(L)$, as described above. Alternatively, the simulation may continue until a total number of users to continue drops below a predetermined threshold $\epsilon$.

Simulation component 404 may be used to perform method step 208 of FIG. 2 and step 314 of FIG. 3. Comparison component 408 compares document vector 416 to weighted distribution item 418 obtained from the distribution component 406. Distribution component 406 responds to hypermedia linked document collection 410 and produces weighted distribution item 418. Distribution component 406 may be used to perform method step 212 of FIG. 2 and step 312 of FIG. 3. The output of comparison component 408 is an inferred information need 420. Comparison component 408 may be used to perform method step 204 of FIG. 2 and 312 of FIG. 3.

It should be appreciated that the description herein is merely illustrative, and should not be read to limit the scope of the invention nor the claims hereof.

What is claimed is:

1. A method for inferring an information need from a plurality of usage documents in a collection of linked documents accessed by a user, comprising:

for each document in the collection of linked documents, identifying incoming and outgoing link information among the documents to produce a document topology matrix, wherein said linked documents include a plurality of content items indicated by keywords;

receiving an observed user path item, wherein the observed user path item indicates the plurality of usage documents accessed by the user using the incoming and outgoing link information among the documents;

applying a network flow model to the document topology matrix using the observed user path item as an activation source to produce a document vector indicating documents in the collection of linked documents having predicted relevance to the plurality of usage documents;

producing a document word frequency matrix indicating a frequency distribution of occurrences of the keywords in each of said documents in the collection of linked documents; and comparing the document vector produced by applying the network flow model to the document word frequency matrix to determine set of keywords indicating the inferred information need based on the plurality of usage documents accessed by the user.

2. The method of claim 1, wherein the network flow model is a spreading activation algorithm.

3. The method of claim 1, further comprising the step of applying a weighting value to at least one of the plurality of usage documents in the observed user path to indicate the order in which documents were accessed.

4. The method of claim 1, wherein the step of applying the network flow model is performed iteratively in accordance with a predetermined threshold $\epsilon$.

5. The method of claim 1, wherein the step of applying the network flow model is performed for a predetermined number of iterations.

6. The method of claim 1, wherein step of applying the network flow model is performed iteratively in association with a proportion value, wherein the proportion is determined by the function $\alpha(L)$.

7. A system for inferring an information need from a plurality of usage documents in a collection of linked documents accessed by a user, comprising:
   an identification component for identifying incoming and outgoing link information for each of a plurality of documents in the collection of linked documents to produce a topology matrix, wherein said linked documents include a plurality of content items indicated by keywords;
   a simulation component for applying a network flow model to the document topology matrix using an observed user path item as an activation source; the observed user path item indicating a plurality of usage documents accessed by the user using the incoming and outgoing link information among the documents; the network flow model producing a document vector indicating documents in the collection of linked documents having predicted relevance to the plurality of usage documents;
   a distribution component for producing a document word frequency matrix indicating a frequency distribution of occurrences of the keywords in each of the documents in the collection of linked documents; and
   a comparison component for comparing the document vector produced by the network flow model to the the document word frequency matrix to determine a set of keywords indicating the inferred information need based on the plurality of usage documents accessed by the user.

8. The system of claim 7, wherein the network flow model is a spreading activation algorithm.

9. The system of claim 7, further comprising a weighting component for applying a weighting value to at least one of the plurality of usage documents in the observed user path to indicate the order in which documents were accessed.

* * * * *